United States Patent [19]
Fechalos et al.

[11] Patent Number: 5,347,512
[45] Date of Patent: Sep. 13, 1994

[54] TELECOMMUNICATION SYSTEM WITH DELAY DATA BUFFER AND METHOD

[75] Inventors: William A. Fechalos, Naperville; Barry W. Jones, Hoffman Estates, both of Ill.

[73] Assignee: Rockwell International Corporation, El Segundo, Calif.

[21] Appl. No.: 124,056

[22] Filed: Sep. 17, 1993

[51] Int. Cl.⁵ .......................... H04J 3/12; H04M 3/22
[52] U.S. Cl. ................................. 370/58.2; 370/58.3; 370/68.1; 370/108; 370/110.3; 379/97; 379/229; 379/280; 379/283
[58] Field of Search .............. 370/58.1, 58.2, 108, 370/110.1, 110.3, 58.3, 61, 68.1; 379/93, 94, 97, 98, 162, 207, 229, 230, 235, 258, 268, 280, 283, 356

[56] References Cited

U.S. PATENT DOCUMENTS

| | | |
|---|---|---|
| 4,627,047 | 12/1986 | Pitroda et al. .............. 370/110.1 X |
| 4,694,452 | 9/1987 | Beckinger et al. .......... 370/110.1 X |
| 4,955,054 | 9/1990 | Boyd, Jr. et al. .............. 370/58.3 X |
| 5,127,004 | 9/1992 | Lenihan et al. .................... 370/110.2 |
| 5,140,611 | 8/1992 | Jones et al. .............................. 375/7 |
| 5,224,108 | 6/1993 | McDysan et al. ............. 370/58.2 X |
| 6,268,903 | 12/1993 | Jones et al. ..................... 370/110.1 |

Primary Examiner—Wellington Chin
Assistant Examiner—Melvin Marcelo
Attorney, Agent, or Firm—C. B. Patti; H. F. Hamann

[57] ABSTRACT

A telecommunication system (10) having a multiport receiving switch (12) with a central control circuit (14) for distributing information received over a multichannel link (28) from a multiport sending switch (30) to at least one of a plurality of various applications in the telecommunication system (10) with a data delay buffer (54) for temporarily delaying the sending of data transmitted across the multichannel link (28) to a peripheral circuit (26) for a predetermined interval in response to the seizing of a channel at the receiving switch (12).

42 Claims, 7 Drawing Sheets

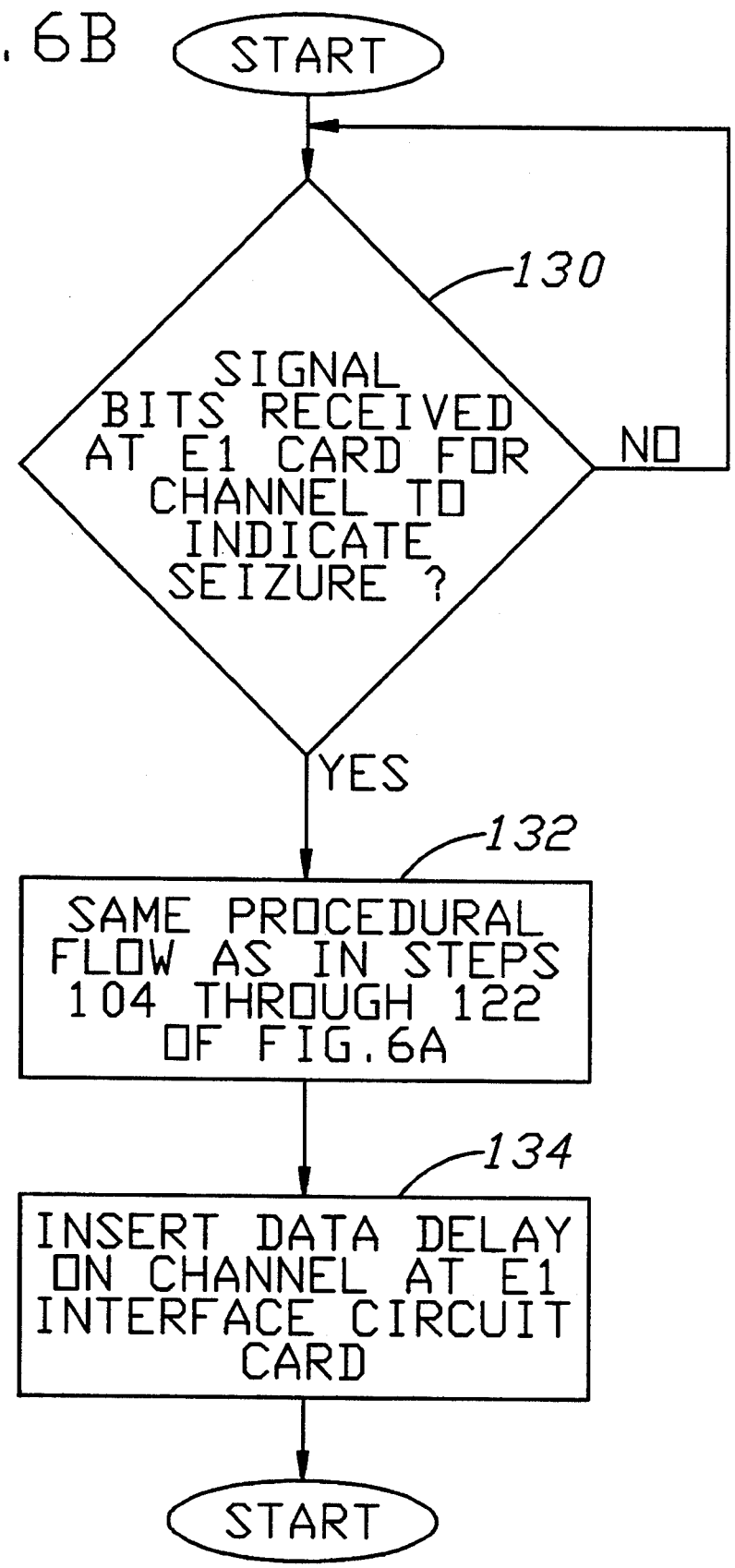

TELECOMMUNICATION SYSTEM WITH DELAY DATA BUFFER AND METHOD

BACKGROUND OF THE INVENTION

1. Field of the Invention

This invention relates generally to the field of telephonic switching systems and methods and, more particularly, to such telephonic switching systems and methods having a multiport switch with a distributed architecture in which signaling information is conveyed to the multiport switch of the telephonic switching system over multichannel links.

2. Description of the related art including information disclosed under 37 C.F.R. §1.97–1.99

Digital telephonic switching systems employing a multiport switch having a central control circuit for distributing information received over a multichannel link from another sending switch are well known. It is also known in such telephonic switching systems to have a distributed architecture in which the processing of information is performed at a variety of peripheral circuits, and the resultant data is sent to the central control circuit for further processing with the data received from other multiport switches. A distributed architecture is advantageous in digital telephonic switching systems since distributed processing is often an efficient means of enhancing computer processing power by having each peripheral circuit preferably devoted to a specialized task. Examples of such telephonic switching systems are shown in U.S. patent application Ser. No. 07/770,197 of Jones et al. entitled "Multichannel Telephonic Switching Network With Different Signaling Formats and Connect/PBX Treatment Selectable For Each Channel", filed Oct. 2, 1991, now U.S. Pat. No. 5,268,903 ; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

Typically in such digital telephonic switching systems or telecommunication systems, signaling information is conveyed from a sending multiport switch to a receiving multiport switch over multichannel circuits for the purpose of making individual voice connections. The forms of the signalling information sent over the multichannel link involves the sending switch sending certain signaling bits on the multichannel link to convey to the receiving switch that a channel is being seized. The channel is seized on the receiving switch preferably for the purpose of making a connection between the switches in order for certain data such as dual tone multiple frequency (DTMF) tones to be sent over a pulse code modulation (PCM) path at 64 Kbits per second. The data in the form of DTMF tones is sent on the seized channel to identify to the receiving switch the specific party being called at the sending switch.

In such known telecommunication systems there are several types of trunks in which the interval period is quite short between the time an indication of channel seizure is made and the time at which a stream of DTMF tones are initially sent to the sending switch. Frequently, these short interval time periods between channel seizure and data sending between two switches is seen in a variety of European switching systems employing an E-1 digital telephony format. Disadvantageously, for a multiport receiving switch having a distributed architecture, interface with a sending switch having trunks with a short interval between channel seizure and the start of data transmission is frequently very problematic. The data transmitted between a sending switch and a receiving switch is often sent in the form of DTMF tones. Switches having a distributed architecture have various peripheral circuit elements performing different functions such as: signaling bit interpretation, DTMF tone detection and interpretation, assignment of channel connections and overall switch control. However, with the distribution of functions to a plurality of peripheral circuits, a significant amount of time is spent coordinating the activities of each peripheral circuit element and ultimately performing the appropriate action within the system. Unfortunately, the time interval needed to control and coordinate all the activities between the peripheral circuits and the central control circuit often is longer than the time period between the channel seizure and the receipt of incoming information.

In a situation where DTMF tones are sent from a sending switch to a receiving switch, an adequate amount of time frequently is not available to assign a DTMF receiver at the receiving switch in order to appropriately interpret the incoming DTMF tones. Disadvantageously, since the time interval between a seizure of a channel and the sending of information is shorter than the time interval needed to prepare and coordinate the peripheral circuits in a distributed architectured switch, some or all of the incoming information will be missed by the receiving switch. Thus, the receiving switch cannot interpret an incoming DTMF tone stream and the switch is unable to properly service a telephonic call.

SUMMARY OF THE INVENTION

It is therefore the principal object of the present invention to provide a telecommunication system and method in which the sending of data transmitted over a multichannel link from a multiport sending switch to a peripheral circuit of a multiport receiving switch is delayed to overcome the problems noted above.

This object is achieved by provision of a telecommunication system having a multiport receiving switch with a central control circuit for distributing information received over a multichannel link from a multiport sending switch to at least one of a plurality of peripheral circuits which perform a plurality of various applications in the telecommunication system, with a delay data buffer comprising means responsive to receipt of certain signalling information at the receiving switch to seize a channel at the receiving switch for receipt of data transmitted from the sending switch to at least one of the peripheral circuits of the receiving switch and means responsive to the seizing of the channel at the receiving switch for temporarily delaying the sending of the data to the one peripheral circuit for a predetermined interval.

Also, the object of the invention is obtained by providing a telecommunication system having a multiport receiving switch with a central control circuit for distributing information received over a multichannel link from a multiport sending switch to at least one of a plurality of peripheral circuits which perform a plurality of various applications in the telecommunication system, with a delay data buffer comprising means for maintaining a temporary delay for the sending of data transmitted from the multiport sending switch to one of the plurality of peripheral circuits at the multiport receiving switch and means for removing the temporary delay maintaining means in response to the connection of a call between the multiport sending switch and the multiport receiving switch.

Moreover, obtainment of the object is achieved by provision, in a telecommunication system having a multiport receiving switch with a central control circuit for distributing information received over a multichannel link from a multiport sending switch to at least one of a plurality of peripheral circuits which perform a plurality of various applications in the telecommunication system, of a method for delaying sending of data to a peripheral circuit comprising the steps of (a) seizing a channel at the receiving switch for receipt of data transmitted from the sending switch to at least one of the peripheral circuits of the receiving switch in response to receipt of certain signaling information at the receiving switch and (b) temporarily delaying the sending of the data to the one peripheral circuit for a predetermined interval in response to the seizing of the channel at the receiving switch.

The object of the invention is further achieved by providing in a telecommunication system having a multiport receiving switch with a central control circuit for distributing information received over a multichannel link from a multiport sending switch to at least one of a plurality of peripheral circuits which perform a plurality of various applications in the telecommunication system, a method for delaying the sending of data to a peripheral circuit comprising the steps of (a) maintaining a temporary delay for the sending of data transmitted from the multiport sending switch to one of the plurality of peripheral circuits at the multiport receiving switch and (b) removing the temporary delay maintaining means in response to the connection of a call between the multiport sending switch and the multiport receiving switch.

BRIEF DESCRIPTION OF THE DRAWINGS

The foregoing objects and advantageous features of the invention will be explained in greater detail and others will be made apparent form the detailed description of the preferred embodiment of the present invention which is given with reference to the several figures of the drawing, in which:

FIG. 6B is a flow chart for an alternate method for maintaining the temporary delay of the received data from a sending switch for interconnection with the receiving switch of FIG. 1.

DESCRIPTION OF THE PREFERRED EMBODIMENT

Figure 1:
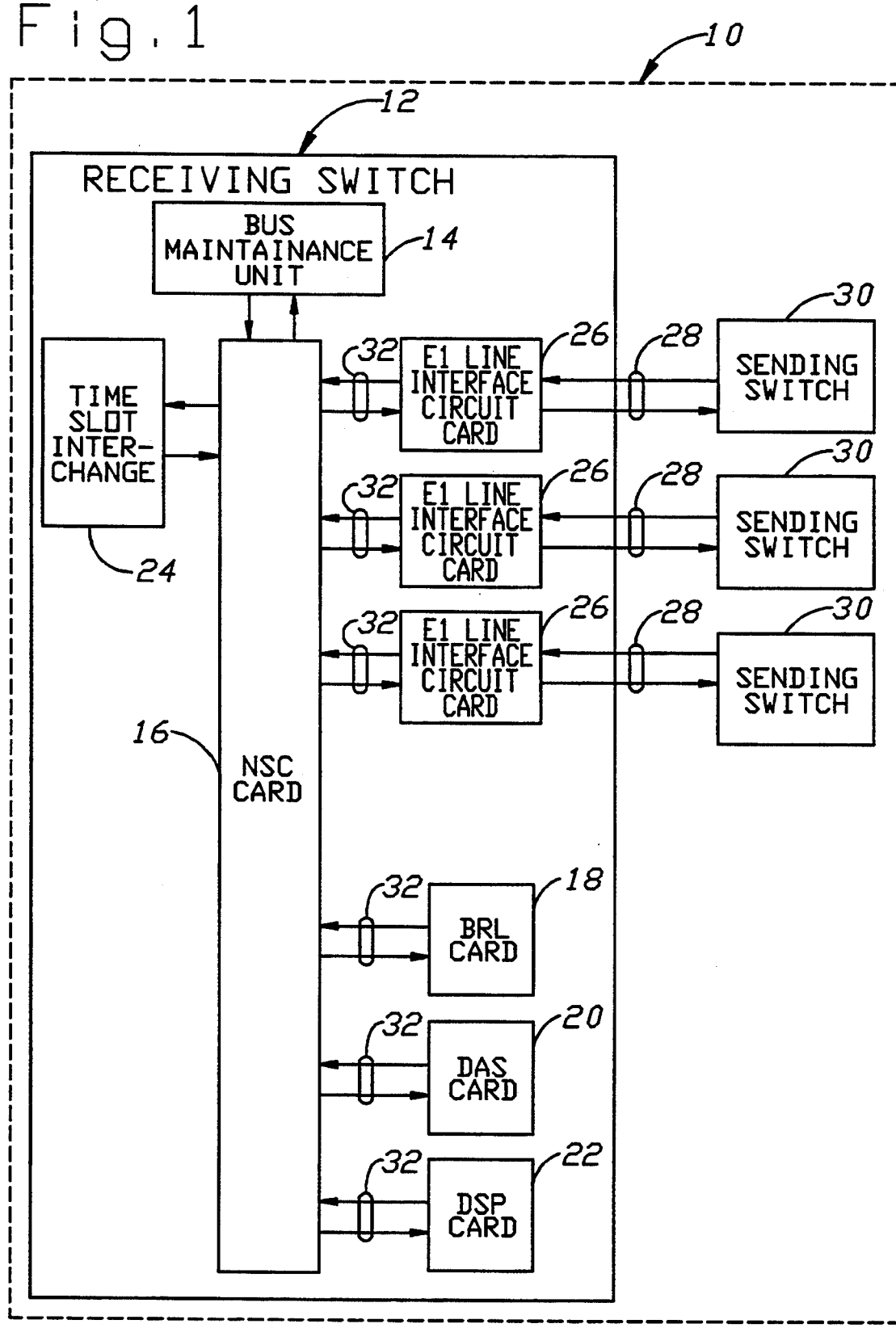
FIG. 1 is a functional block diagram of the preferred embodiment of the telecommunication system of the present invention.

Referring to FIG. 1, the telecommunication system 10 is shown having a receiving multiport switch 12 with a central control circuit also called a bus maintenance unit circuit, or BMU, 14. The BMU 14 is the primary control circuit in the digital multiport receiving switch 12. Preferably, the processing power for the BMU 14 is provided by a Motorola 68030 microprocessor running at a thirty-three MHz clock rate. Coupled with the BMU 14 is a network shelf control, or NSC, circuit 16.

The NSC circuit 16 acts as a message handler between the BMU 14 level of call processing and the plurality of peripheral circuits, such as: a basic rate line (BRL) circuit 18, a digital audio source (DAS) circuit 20 and a digital signal processor (DSP) circuit card 22. The NSC card 16 is preferably controlled by a Motorola 68000 microprocessor operating at 10 MHz. Additionally, the NSC 16 is provided with thirty-two Kbytes of EPROM (not shown) for the purpose of very basic diagnostics and for boot-loading code. Coupled with the NSC card is the time slot interchange, or TSI, network 24 which performs the pulse code modulation (PCM) functions within the digital multiport receiving switch 12. The TSI network 24 provides the capability for nonblocking connection of seven hundred sixty-eight DS0 channels in a single node implementation and a nonblocking connection of up to three thousand seventy-two channels in a four node implementation. In the time slot interchange network 24, connections between channels are established under control of the BMU 14 of the receiving switch 12.

As seen in FIG. 1, the NSC circuit card 16 has serial network links 32 connecting the timeslot interchange network 24 to a plurality of peripheral circuits or termination circuit cards. The peripheral circuits include but are not limited to a plurality of substantially identical E1 line interface circuit cards 26 preferably employing a delay data buffer 54 shown in FIG. 3; basic rate line circuit cards 18, FIG. 1, which provide an interface to telephonic units (not shown) co-located with the receiving switch 12; digital audio source circuit cards 20, acting as sources of recorded voice and dual tone multiple frequency (DTMF) output tones; and digital signal processing (DSP) circuit cards 22 used to receive and interpret incoming DTMF tones. Details of these circuits are described in some of the aforementioned patents to which reference may be made for further information.

The multiport receiving switch 12, under the control of the BMU 14, distributes information received over multichannel links 28 from the multiport sending switches 30. The BMU 14 of the receiving switch 12 sends this information to the plurality of peripheral circuits 18, 20, 22 and 26, which as described above, perform various applications in the telecommunication system 10. The multiport sending switch 30 transmits certain signaling information, preferably in the form of incoming signaling bits, to the multiport receiving switch 12. In response to receipt of the signaling information transmitted from the sending switch 30, the receiving switch 12 seizes a channel designated by the signaling information. The signaling information obtained at the multiport receiving switch 12 is relayed to the bus maintenance unit control circuit 14 via the NSC circuit card 16 in order for the receiving switch to make decisions and direct the appropriate action. Once a channel is seized, the receiving switch 12 is aware that data, preferably in the form of DTMF tones transmitted from the sending switch 30, are to follow and to be subsequently sent to the peripheral circuits 18, 20 and 22 of the receiving switch. In the preferred embodiment, DTMF tones received from the multiport sending switch 30 are interpreted at the DSP circuit 22.

The data in the form of DTMF tones are sourced by a multiport sending switch 30, received on the E1 interface circuit card 26 passed via the network link 32 to the NSC circuit card 16 and the timeslot interchange 24. The DTMF tones under the control of the BMU 14 are switched back out of the NSC card 16 to the destination digital signal processor circuit card 22 for interpretation at the DSP card prior to receipt of the DTMF tone data. The DSP circuit 22 is also previously informed that the DTMF data is soon to be switched to it in order for the DSP circuit 22 to prepare to interpret this tone information before it arrives. The coordination between the various circuit cards of the receiving switch 12 often takes a considerable amount of time.

Since the coordination time is often longer than the period between a channel seizure and the transmission of DTMF tones from the sending switch 30, in accordance with the present invention, the E1 interface circuit 26 temporarily delays the sending of the data in the form of DTMF tones to the DSP card 22 for a predetermined interval. The E1 interface circuit 26 effectively lengthens the interval between an incoming channel seizure detection and the arrival of the DTMF stream at the DSP card 22. The E1 interface circuit 26 insures that the DSP card 22 is prepared for the delivery of the incoming DTMF stream to thereby prevent DTMF information from being lost due to the setup time of the receiving switch 12.

The E1 interface circuit 26 acts to induce a delay on the pulse code modulated (PCM) path within the receiving switch 12 from the multichannel link 28. Preferably, the PCM path delay is IN (or ON) upon an incoming channel seizure from the sending switch 30 and receiving switch 12. However, maintaining the PCM path delay at the E1 line interface circuit 26 while human voice communication is established between the sending switch 30 and receiving switch 12 creates a highly undesirable echo effect. The voice received from a distant calling party at the sending switch 30 reflects back to the calling party at the analog circuitry in the telephonic equipment in the sending switch with the delay induced by the E1 interface circuit card 26 at the receiving switch 12. In turn, the calling party at the sending switch 30 perceives the reflected voice as a highly undesirable echo. Therefore, once the telephonic call is fully established and prior to voice conversation beginning over the seized channel, the temporary PCM path delay is terminated. Advantageously, this problem is avoided in the present invention by enabling the E1 line interface circuit card 26 to switch a PCM path delay IN (or ON) for the set up portion of the telephonic call and OUT (or OFF) in response to the call being established.

Preferably, the E1 interface circuit card 26 interfacing to the multiport sending switch 30 is a thirty-two channel digital interface. The thirty-two channels of the interface often are in differing states during progress of a telephonic call. For example, some telephonic calls on certain channels are fully established, while other telephonic calls on other channels are in the process of establishing a call (i.e. in call set up), and furthermore, other telephonic calls are in an idle state on other channels. The E1 interface circuit card 26 preferably handles thirty-two channels and establishes a PCM delay IN (or ON) for some channels while establishing a PCM delay OUT (or OFF) for other channels. While the E1 interface circuit card 26 of the present invention can generally be implemented in numerous types and sizes of telecommunication systems, it is preferably employed in a telecommunication system of the type shown in U.S. patent application Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986, to which reference should be made for details.

Figure 2:
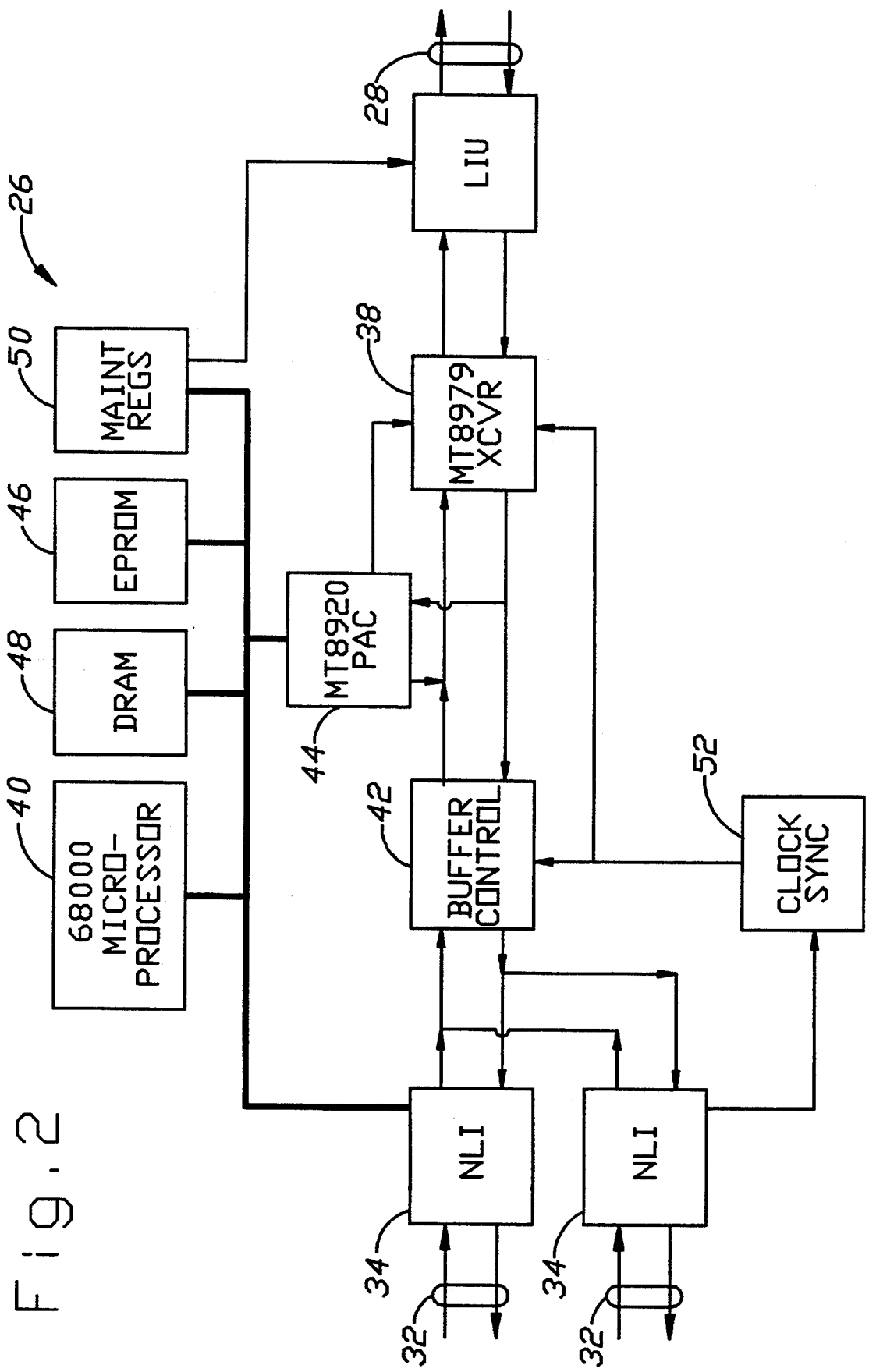
FIG. 2 is a functional block diagram of the E1 line interface circuit card of the telecommunication system of FIG. 1 of the present invention.

Referring to FIG. 2, the E1 line interface circuit card 26 is shown with two Network Link Interface circuits 34 providing two network links 32 to the NSC circuit 16, FIG. 1, of the receiving switch. Each network link interface, or NLI, circuit 34 supports twenty-four channels of pulse code modulation, or PCM, and signaling transmission between the E1 interface circuit 26 and the NSC circuit card 16. The network link interface integrated circuit also provides message communication between the 68000 microprocessor 40 and the bus maintenance unit 14, FIG. 1, via the network shelf controller 16. Since the multichannel link of the E1 line 28 contains thirty-two channels, more than one NLI 34 handling twenty-four channels is needed to connect all thirty-two channels from the sending switches 30, FIG. 1, to the receiving switch 12.

The E1 interface circuit card 26 is shown, FIG. 2, with the multichannel link 28 interconnecting the multiport sending switch 30, FIG. 1. The line interface unit, or LIU, 36 connects the E1 line interface circuit 26 to the multichannel link of the E1 line 28. The LIU 36 provides conversion between E1 line signal levels and coding as defined by standard CCITT (Consultative Committee on the International Telegraphy and Telephony) specifications and standard TTL (transistor logic) level signals for connection to the Mitel MT8979 transceiver 38. The LIU 36 further provides isolation of the E1 interface circuit card 26 from potential hazardous energy on the E1 line 28. For further information on standard E1 line signaling specifications reference should be made to Sections G.703, G.704 and G.732 of CCITT Blue Book Vol. III—Fascicle III.4 "General Aspects of Digital Transmission Systems", Geneva, 1972.

The E1 interface circuit card 26 is under the control of a Motorola 68000 microprocessor. The 68000 microprocessor 40 has visibility to the incoming signaling bits received from an E1 line 28 via a parallel interface to an MT8920 parallel access circuit, or PAC, 44 which connects to the MT8979 transceiver 38. The pulse code modulation of data received from the sending switch 30, FIG. 1, flows through the line interface unit, or LIU, 36 and transceiver 38 to a buffer control circuit 42, FIG. 2, where data is buffered and selectively delayed prior to transmission to the NSC 16 via the NLI interface 34.

The transceiver, or framer, 38 is preferably a Mitel 8979 switch component. The transceiver 38 frames on the incoming E1 line 28 by finding the beginning of the first channel of the first bit in the received data pattern. In the preferred embodiment, the thirty-two channel incoming E1 line 28 contains thirty pulse code modulated voice channels, signaling data being in one channel and link control information in another channel. The transceiver 38 buffers each received byte and delivers a serial PCM stream of the received data to the buffer control circuit 42 with a synchronization pulse indicating the beginning of the first bit of the first channel. The MT8979 transceiver 38 additionally delivers a signaling stream of the received data to the buffer circuit 42 and the MT8920 parallel access circuit, or PAC, 44 with a synchronization pulse indicating the beginning of the first bit of the first channel. In the other direction of transmission a serial PCM stream is provided by the buffer circuit 42, and a serial stream is provided by either the buffer circuit or the PAC 44 are delivered to the transceiver 38. The transceiver 38 frames the serial signaling stream and the PCM stream of information and delivers it to the line interface unit 36 for transmission on the outgoing E1 line 28.

The parallel access circuit, or PAC, 44 is coupled with the transceiver 38. The PAC 44 has a microprocessor interface to the 68000 microprocessor 40 and the PAC 44 contains internal registers which are readable and writable by the processor. Data written to the registers of the PAC 44 by the microprocessor 40 are conveyed in serial fashion to the transceiver 38 for specifying the appropriate mode of the transceiver operation and for directly controlling output bytes on the outgoing E1 line 28.

The electrically programmable read only memory (EPROM) 46 of the E1 line interface circuit 26 stores a boot loader program which is executed by the 68000 microprocessor 40 upon power up. The EPROM 46 boot loader program facilitates the downloading of the stored program (illustrated by the flow chart of FIGS. 6A and 6B) from the BMU 14, FIG. 1, to the dynamic random access memory, or DRAM, 48. The bus maintenance unit 14 delivers the stored program to the DRAM 48. Once the downloading of the stored program is completed, the 68000 microprocessor 40 begins to execute the stored program. Within the memory spectrum of the microprocessor 40 are maintenance registers 50. A two bit delay setting and thirty-two bits of channel on/off settings are written into and are readable by the 68000 microprocessor 40 as part of the maintenance registers 50.

The network link interface circuits 34 and the TSI 24 of the receiving switch 12, FIG. 1, operate at multiples of 1.544 MHz frequency. The E1 line 28, the line interface unit 36 and the transceiver 38 operate at multiples of a 2.048 MHz frequency. A clock sync circuit 52 synchronizes these different frequencies in order to ensure accurate communication within the E1 line interface circuit card 26 without loss of data.

In response to the 68000 microprocessor 40 recognizing from the state of the incoming signaling bits that an incoming channel is being seized at the receiving switch 12, FIG. 1, the microprocessor changes the PCM path delay for the seized channel from OFF to ON. In response to a message being conveyed to the microprocessor 40 via the network link interface 34 from the bus maintenance unit 14, FIG. 1, that a telephonic call connection is established for a given channel as a result of the received DTMF tone stream from the sending switch 30, the microprocessor switches the PCM path delay back to OFF for the seized channel.

In the alternative, the microprocessor 40 defaults to a delay ON state for the channels when there is no telephonic call connected between the sending switch 30 and receiving switch 12 (i.e. during the idle state) as opposed to inserting the delay in response to an incoming channel source. In this alternative approach, the E1 line interface circuit 26 maintains a temporary delay of the sending of data transmitted from the sending switch 30, FIG. 1, to one of the peripheral circuits (i.e. the DSP card 26) at the receiving switch 12. The temporary delay which is set for a predetermined interval is removed in response to the connection of a call between the sending switch 30 and the receiving switch 12. Once the call between the sending switch 30 and receiving switch is terminated, the E1 line interface circuit 26 re-establishes the temporary delay for the predetermined interval of time.

Figure 3:
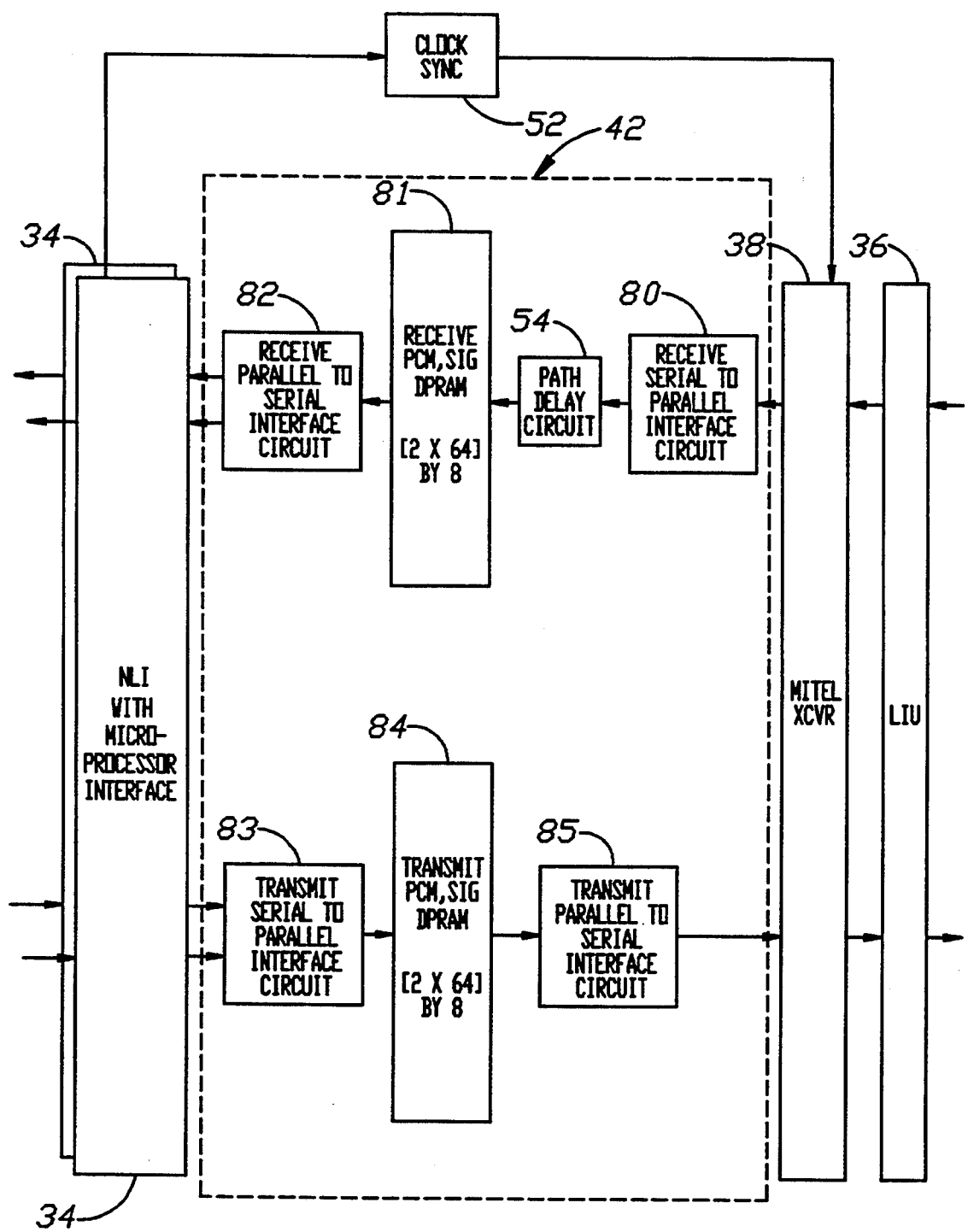
FIG. 3 is a functional block diagram of the buffer control circuit of the E1 line interface circuit card of FIG. 2.

Referring to FIG. 3, the PCM and signaling paths are shown with the buffer control circuit 42 coupled with the transceiver 38 and the network link interface 34. The line interface unit 36 is coupled with the Mitel 8979 transceiver 38 for conversion between the E1 line 28 signal levels received from the multiport sending switches 30 and the standard TTL level signal for connection with the transceiver 38. The clock sync circuit 52 synchronizes the frequency rates between the network link interface 34 and the transceiver 38. A receive parallel to serial interface circuit 80 of the buffer control circuit 42 is coupled between the transceiver 38 and the PCM path delay circuit or delay data buffer 54 described in detail with reference to FIGS. 4 and 5. A receive serial to parallel interface circuit 80 takes the serial data stream in the form of DTMF tones from the sending switch 30, FIG. 1, which is delivered by the transceiver 38, FIG. 3, and forms an eight bit parallel byte corresponding to the data of a channel. The eight bit parallel byte is delivered by the receive serial to parallel interface circuit 80 to the PCM path delay circuit 54. The received byte is stored in a position of the receive dual port random access memory, or DPRAM, 81 addressed by the channel number.

The receive parallel to serial interface circuit 82 reads data from the receive DPRAM 81 addressed by a channel number as an eight bit byte. The receive parallel to serial interface circuit 82 converts the eight bit byte into a serial data stream for output to the NLI 34. One serial stream is formulated for each of the two network link interface circuits 34. Twenty-four channels of data received from the E1 line 28, FIG. 2, are sent to one NLI 34 and the other eight channels are sent to the other NLI 34. The buffer control circuit 42 has a transmit serial to parallel interface circuit 83, a transmit PCM signal dual port RAM 84 and a transmit parallel to serial interface circuit 85 which operate in the same manner in the transmit direction as the receive serial to parallel circuit 80, the receive DPRAM 81 and the receive parallel to serial circuit 82, respectively, do in the receiving direction.

Figure 4:
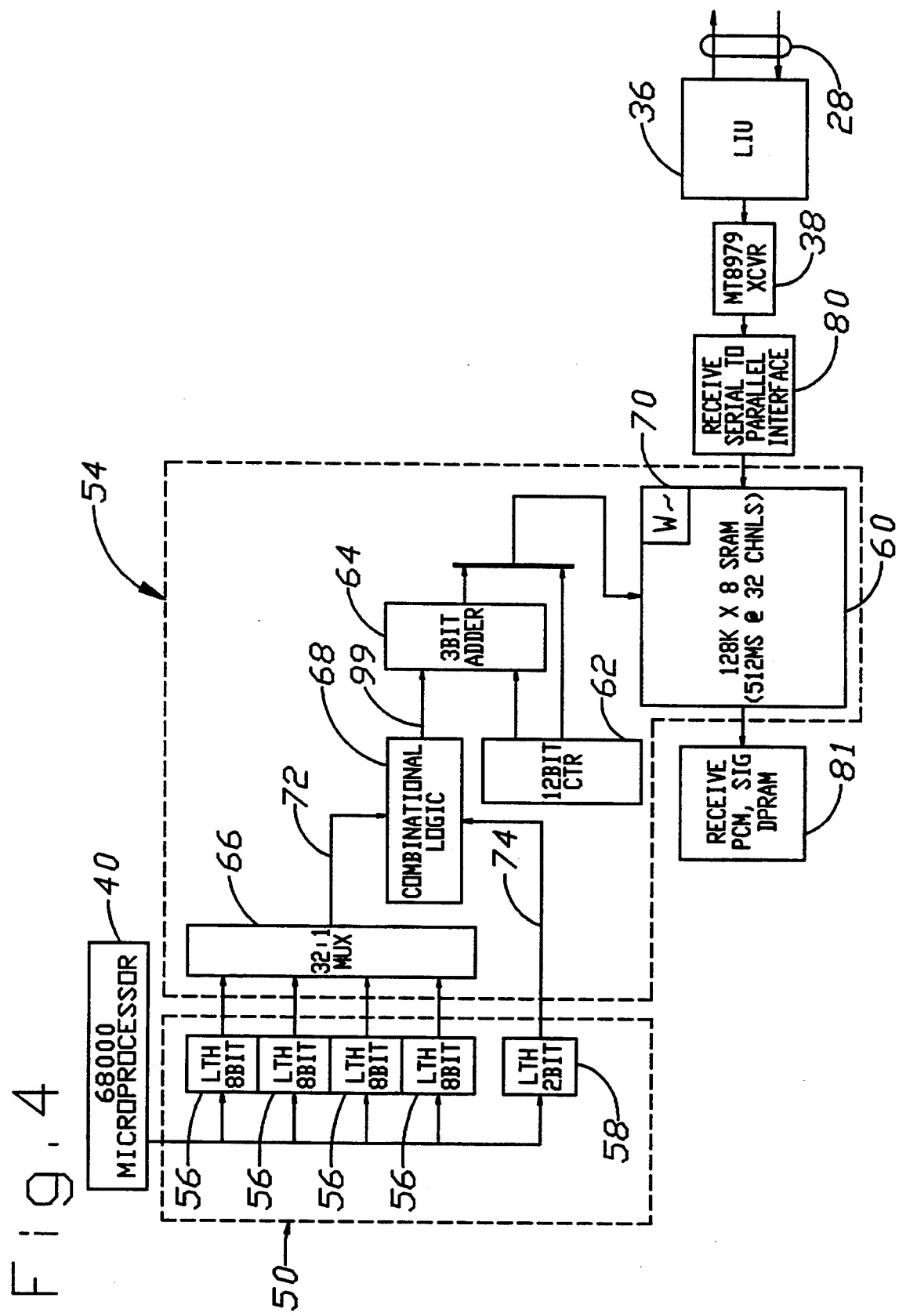
FIG. 4 is a functional block diagram illustrating the preferred embodiment of the pulse code modulation (PCM) path delay circuit of the buffer control circuit of FIG. 2.

Referring to FIG. 4, the 68000 microprocessor 40 has a thirty-two bit latch comprised of four eight bit latches 56 which it reads from and writes to. Each bit in the four eight bit registers 56 corresponds to one channel on the thirty-two channel incoming E1 line 28. In response to the microprocessor 40 writing a given bit to one, the pulse code modulation path delay is ON for the corresponding channel for the channel bit. In response to the microprocessor 40 writing the bit to zero, the PCM path delay is OFF for the corresponding channel. In the PCM path delay circuit, or data delay buffer, 54, any number and combination of channels alternatively have the PCM path delay ON while other channels have their delay OFF. Thus, different delay intervals for the sending of DTMF tones to the DSP card 26, FIG. 1, is established for different channels on the multichannel link 28.

The four eight bit latches 56, FIG. 4, and a two bit latch 58 are part of the maintenance registers 50 described above with reference to FIG. 2. In the two bit latch 58, FIG. 4, the microprocessor 40 writes a two bit code dictating the amount of delay which is produced in response to the PCM path delay being switched ON for a particular channel. Selectively changing the two bit code for a particular channel changes the predetermined interval of the delay of sending data to the DSP card. If the setting of these two bits is 00, no delay is produced independent of the per channel ON/OFF settings 72, FIG. 5. By placing the two bits on the latch 58 to a setting other than 00, one of the predetermined amounts of delay is produced for those channels set to have the delay ON. Alternatively, more bits are employed to provide a wider range of delays or bits are set aside for each channel to have to provide a wider range of delays. Furthermore, bits are alternatively set aside in order for each channel to have a customized amount of delay produced when set to have the PCM path delay ON. The data delay buffer 54 establishes different predetermined delay intervals for the sending of data. The data is preferably sent in the form of tones to the peripheral circuits at the receiving switch 14 for different channels on the multichannel link 28.

The PCM path delay circuit 54, FIG. 4, interrupts the receive path between the network link interface 34 and the transceiver 36 by means of the inserting of two latches between the serial to parallel interface circuit 80 and a static random access memory, or SRAM, 60. The SRAM 60 is a 128kX8 random access memory device. If the data delay is ON, the data received on the multichannel link 28 is temporarily stored in the SRAM 60 prior to the sending of the data to the peripheral DSP circuit card 26, FIG. 1. A channel is presented by the receive serial to parallel interface circuit 80, FIG. 4, to the data inputs of the SRAM 60 and is written into the memory, then a read of the SRAM 60 occurs for that channel, and the data is presented on the data outputs of the SRAM to a receive dual port random access memory, or DPRAM, 1. It is the SRAM 60 addressing that dictates the amount of the temporary delay that is produced in the transmission of the data for a seized channel as it progresses from the receive serial to parallel interface 80 to the receive DPRAM 81 and, ultimately, to the multiport receiving switch 12, FIG. 1, for transmission to the digital signal processing circuit card 22.

The SRAM 60, FIG. 4, is organized in blocks of thirty-two locations corresponding to the thirty-two different channels on the incoming E1 line 28. In the 128kX8 SRAM 60, there are four thousand ninety-six blocks of thirty-two locations. Each channel is uniquely identified by a five bit number corresponding to its channel number on the incoming E1 line 28. This five bit number forms the lower portion of the SRAM 60 address during both read and write operations and is also used to select the proper bit in the two bit ON/OFF latch 58 of the channel for selecting whether the PCM path delay is to be ON or OFF for the seized channel.

A twelve bit counter 62 is available which is cleared when power is applied to the E1 interface circuit card 26, FIG. 2. The counter 62 is clocked each time a full set of thirty-two channels has been received on the E1 line 28 (at a 8kHz rate). The twelve bits of this counter 62 form the remaining twelve bits of addressing for the SRAM 60. The upper three bits of this address are modified by a three bit adder 64 during SRAM write cycles when a delay is to be induced on a channel. The setting of the three bit adder 64 induces the PCM path delay by specifying which data written to and stored in the SRAM 60 during past write cycles is now written to the receive DPRAM 81 and ultimately to the NLI 34, FIG. 2, for transmission to the receiving switch 12, FIG. 1, and the DSP circuit card 22.

Specifically, when data for a given channel arrives at the SRAM 60 data inputs from the receive serial to parallel interface circuit 80, it is first written into a memory location where the address is a function of the twelve bit counter 62 value plus any desired delay. Then a read of data from the SRAM 60 occurs which is purely a function of the twelve bit counter 62. If the seized channel is set for delay OFF or the delay setting is set to binary zero-zero for no delay, the data read back from memory is that which was written during the immediately prior write cycle to the SRAM 60 for that channel. If the channel has delay set to ON, and the two bit delay setting is nonzero, then the data read is that written to SRAM 60 at a time prior, exactly equal to the amount of the delay setting. For example, if the two bit setting is binary three, or 11, then the data read is equal to that written to the SRAM 60 two hundred fifty-six milliseconds prior to the receiving of data.

Each channel with the associated eight bit byte are handled seriatim in the data delay buffer 54. After each channel is fully processed, the next successive channel is processed until all thirty-two channels have been processed. In response to each of the sets of thirty-two channels being processed, the twelve bit counter 62 is incremented. When the twelve bit counter 62 reaches the maximum value, the next increment in the count returns the counter to a count of zero.

The thirty-two bits of the maintenance register 50 represented by the four eight bit latches 56 each correspond to one of the channels from the incoming E1 line 28. A set bit for a given channel preferably produces a delay in sending the data in the form of DTMF tones to the receiving switch 12, FIG. 1. If a bit is not set for a given channel, no delay is produced. A thirty-two to one multiplexer 66 is provided with the number of the channel being processed. The multiplexer 66 reads the delay on/off setting for the particular channel. The on/off setting 72, FIG. 4, for the channel is applied to the combinational logic 68 along with the two bit delay setting in the two bit latch 58 which is part of the maintenance registers 50.

Figure 5:
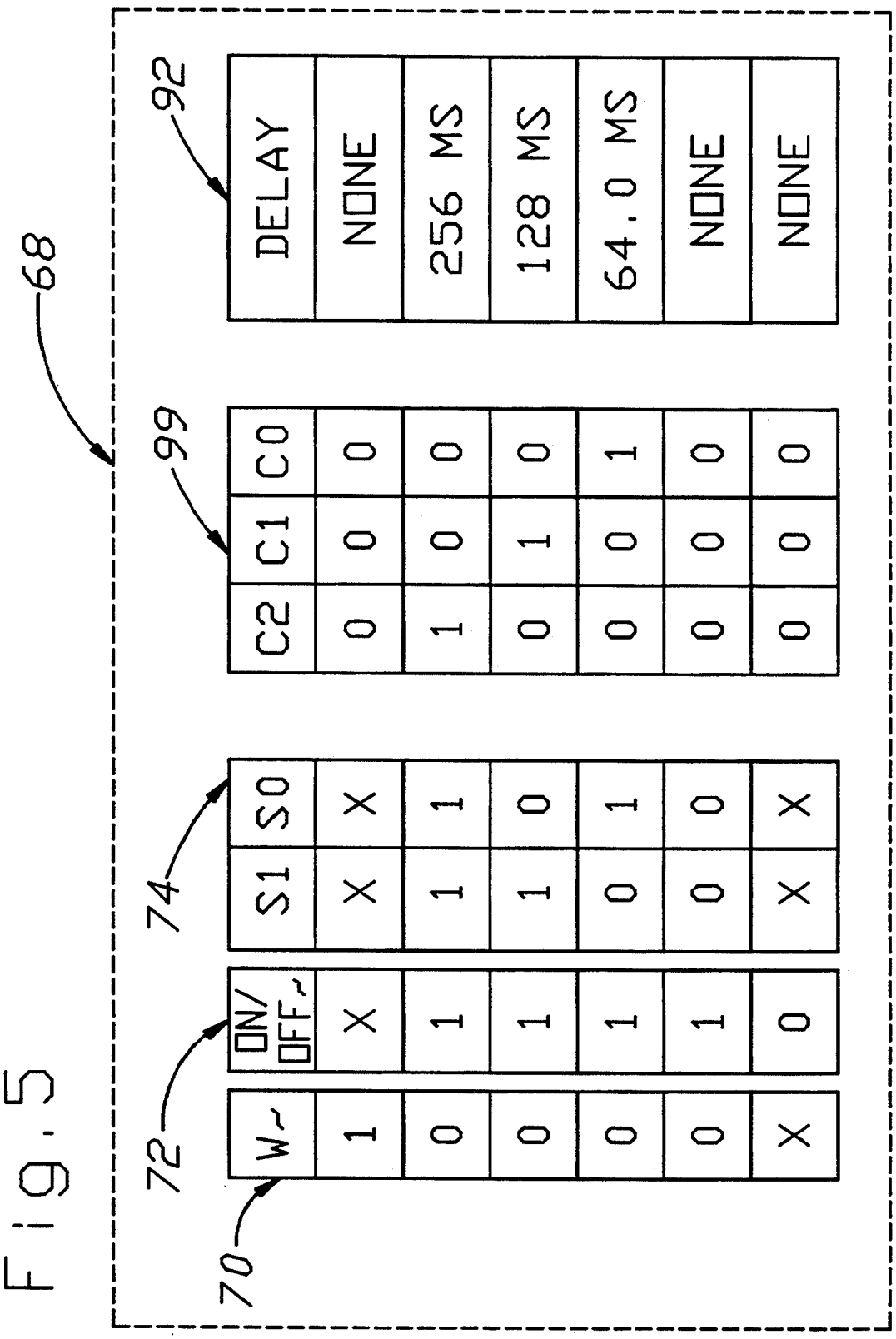
FIG. 5 is a table illustrating the combinational logic of the pulse code modulation path delay circuit of FIG. 4.

Referring to FIG. 5, the operation of the combinational logic 68 is illustrated. During a write cycle to the SRAM 60, FIG. 4, the write input 70, FIG. 5, is zero. During a read cycle, the write input 70 into the SRAM 60, FIG. 4, is one. The outputs of the twelve bit counter 62, FIG. 4, altered by the combinational logic 68 input to the three bit adder 64, form the high order portion of the address. During the read cycles in which the write input 70 is one, the adder 64, FIG. 4, does not effect the output of the twelve bit counter 62. The high order address to the SRAM 60 is exactly equal to the counter outputs. During write cycles, if no delay is set for a channel, the write input 70, FIG. 5, is zero and the ON/OFF setting 72 is zero, the adder 64, FIG. 4, does not effect the output of the twelve bit counter 62 which dictates the high order address to the SRAM 60.

During write cycles in which delay is induced on the channel, whereby the write input 70 is zero and the ON/OFF setting 72 is nonzero, the adder 64 does alter the input to the SRAM 60. The amount of the alteration to the address input is a function of the S1 and S2 delay settings 74 as read from the maintenance registers 50. As seen in FIG. 5 in the preferred embodiment, a binary delay setting value 74 of binary 11 corresponds to a two hundred fifty-six millisecond delay; a delay setting 74 of binary 10 corresponds to a one hundred twenty-eight millisecond delay; a binary 01 setting corresponds to a sixty-four millisecond delay and a binary setting of 00 corresponds to no delay on the selected channel. The C0, C1 and C2 constant values 99 are added to the upper three bits of the twelve bit counter 62, FIG. 4, to achieve the delay setting indicated in the result column 92, FIG. 5.

The processing of a channel through the delay data buffer, or PCM path delay circuit, 54, FIG. 4, consists of a SRAM 60 write followed by a SRAM read. During the write and read cycles, the lower order addresses to the SRAM 60 remain constantly equal to the number of the channel (zero through thirty-one) on the E1 line 28 from which the data is received. The write cycle proceeds the read cycle. During the write cycles, an addition to the three upper bits of the twelve bit counter 62 occurs as a function of the ON/OFF delay setting 72, FIG. 5, for the channel and the delay setting 74. During the read cycle, there are no additions to the outputs of the twelve bit counter 62, FIG. 4, and the data on the outputs directly form the address to the SRAM 60. If no delay is set for the channel, the address written during the write cycle is exactly that which is used during the read cycle. If a delay is produced, the write cycle address differs from the read cycle address. The write cycle address is formed by an addition to the read cycle address and the read cycle address increments each time the entire thirty-two channels are processed. The read cycle address is eventually equal to the previous write cycle address. The read cycle in the preferred embodiment occurs an amount of time later equal to the amount of the specified delay setting corresponding to a 64.0 ms, 128 ms or 256 milliseconds predetermined delay interval. In response to the processing of the entire thirty-two channels, the twelve bit counter 62, FIG. 4, is incremented, and the read address continues to follow the write address pointer through the SRAM 60 with the separation between them corresponding to the amount of the delay specified.

While the advantages of the invention are preferably obtained with the telecommunication system 10 described above with reference to FIGS. 1-5, the method of the invention can be practiced with other telecommunication systems having a multiport receiving switch with a central control circuit for distributing information received over a multichannel link from a multiport sending switch to a plurality of peripheral circuits which perform a plurality of various applications in the telecommunication system. In either case, the preferred method of practicing the invention briefly comprises the steps of (1) seizing a channel at the receiving switch for receipt of data transmitted from the sending switch to at least one of the peripheral circuits of the receiving switch in response to receipt of certain signaling information from the receiving switch and (2) temporarily delaying the sending of the data to the one peripheral circuit for a predetermined interval in response to the seizing of the channel at the receiving switch.

Figure 6A:
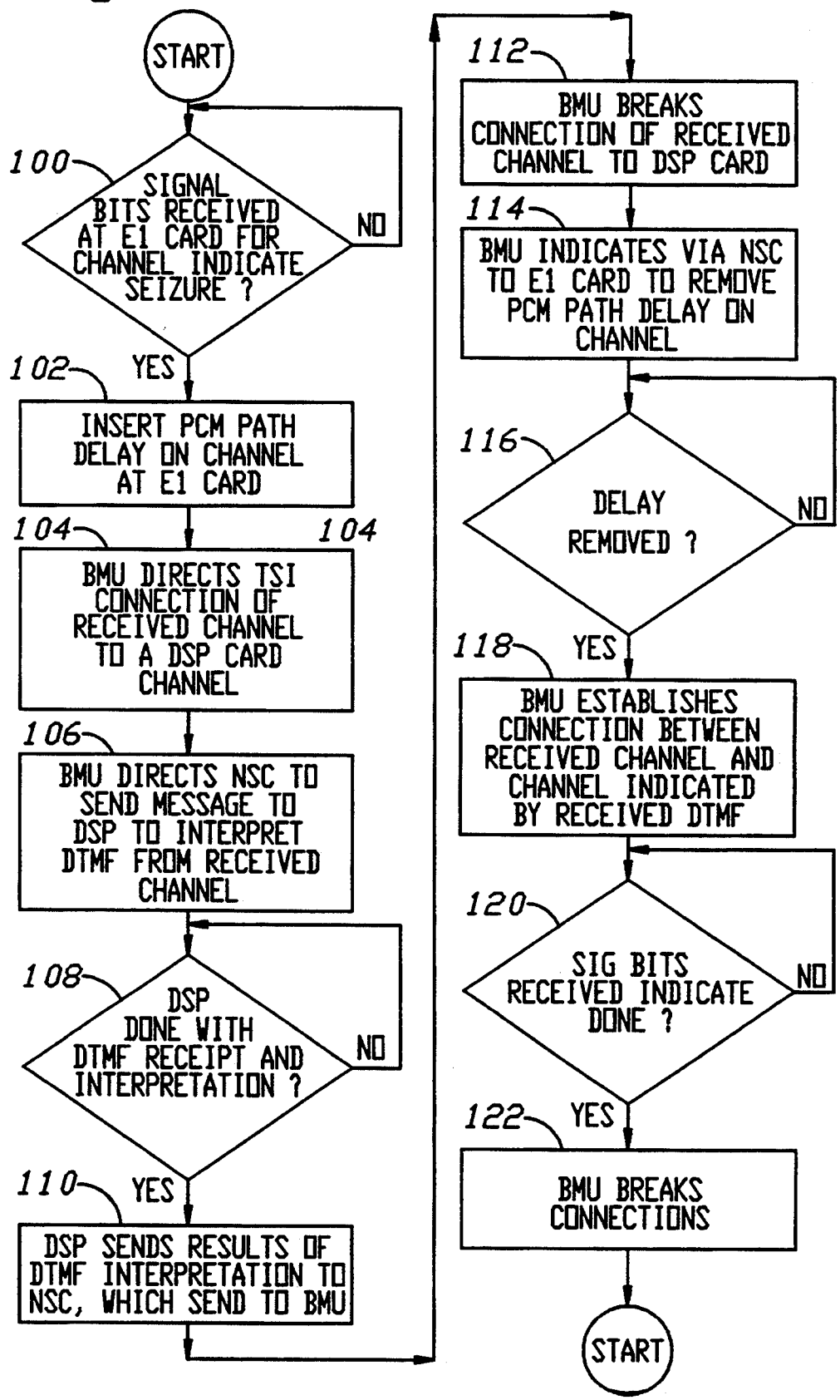
FIG. 6A is a flow chart for the method of delaying the received data from a sending switch for interconnection with the receiving switch of FIG. 1.

Referring to FIG. 6A, this method is preferably performed in the telecommunication system 10, FIG. 1, in a method step 100 by means of the E1 interface circuit 26 receiving signaling bits from the multiport sending switch 30 to indicate the seizure of a designated channel on the receiving switch 12. If no signaling bits are sent, then the receiving switch 12 will not seize a channel and will wait until the signaling bits are sent. If the signaling bits are received at the E1 interface circuit card 26, then in step 102, FIG. 6A, a PCM path delay is inserted for a predetermined interval on the identified channel at the E1 card. The procedural events described above with reference to FIGS. 1-5 for the insertion of the temporary delay at predetermined intervals occur at step 102. This includes writing the data in the form of DTMF tones received from the sending switch in the SRAM 60 and reading the data from the SRAM at a time equal to the amount of the predetermined interval of the delay after the data has been written into the SRAM. In the preferred embodiment, the PCM delay interval is selectively changeable for the various channels on the multichannel link. Furthermore, different delay intervals are established for the sending of the data tones to the DSP card 26, FIG. 1, for the different channels on the multichannel link 28.

In step 104, FIG. 6A, the bus maintenance unit 14, FIG. 1, directs the time slot interchange 24 to connect the identified channel to a channel at the DSP circuit card 22. In step 106, FIG. 6A, the bus maintenance unit 14, FIG. 1, directs the NSC 16 to send a message to the DSP circuit 22 in order for the DSP circuit card 22 to interpret the dual tone multiple frequency, or DTMF, tones received from the sending switch 30 on the identified channel.

In step 108, the bus maintenance unit 14 determines if the DSP circuit card 22 has completed receipt of the DTMF tones and interpretation of the data information associated with the received tones. If the DSP circuit card 22 has not fully received and interpreted the DTMF tones, the DSP circuit card 22 waits until this process is complete. If the DSP circuit card 22, FIG. 1, has completed the receipt and interpretation of the DTMF tones, then in step 110, the DSP card sends the results of the interpretation of the DTMF tones to the NSC circuit 16 which, in turn, sends the information to the BMU 14. In step 112, FIG. 6A, the bus maintenance unit 14, FIG. 1, breaks the connection of the received and identified channel to the DSP circuit card 22. In step 114, FIG. 6A, the bus maintenance unit 14, FIG. 1, signals the E1 interface circuit card 26 via the NSC circuit 16 to remove the PCM path delay on the seized channel.

In step 116, the BMU 14 determines if the delay is removed along the PCM path at the PCM path delay circuit 54, FIG. 4. If the delay is not removed the bus maintenance unit 14, FIG. 1, waits until the delay on the PCM path is removed. If the delay on the PCM path is removed, then in step 118, FIG. 6A, the bus maintenance unit 14, FIG. 1, establishes a PCM path connection for voice communication between the received seized channel and the channel indicated by the received DTMF tones. The temporary delay in the sending of data to the DSP card 26 is terminated in response to the connection of a call in order to prevent an echoing effect perceived at telephone units of the sending switch.

In step 120, the BMU 14 determines that the receipt of signaling bits indicate that the call has been concluded and that the sending switch 30 is no longer seizing the channel at the receiving switch 12. If the signaling bits are not received at the receiving switch 12 indicating that the call has been completed, then the receiving switch 12 waits until the appropriate signaling bits are received. If the signaling bits are received at the receiving switch 12 indicating that the call has been concluded, then in step 122, the bus maintenance unit 14 breaks the connections between the seized channel and the channel indicated by the DTMF tones.

Referring to FIG. 6B, the flow chart illustrates the procedural steps within the telecommunication system 10, FIG. 1, of the preferred embodiment of the invention for the method of maintaining the temporary delay for the sending of data transmitted from the sending switch to a peripheral circuit of the receiving switch and removing the temporary delay in response to the connection of a call between the sending switch and the receiving switch. In step 130, the E1 interface circuit card 26, FIG. 1, receives signaling bits from the multiport sending switch 30 to indicate the seizure of a designated channel on the receiving switch 12. If no signaling bits are sent, then the receiving switch will not seize a channel and will wait until the signaling bits are sent. This alternative method of inserting and removing the PCM data delay next proceeds to step 132 in which the method follows the same flow as in steps 104 through 122 discussed above in FIG. 6A. If the signaling bits are received at the E1 interface circuit card 26, then the method proceeds to step 104 of FIG. 6A in which the bus maintenance unit directs the time slot interchange to connect the identified channel to a channel at the DSP card. Steps 106 through 122 are performed as described above with reference to FIG. 6A.

Once the bus maintenance unit breaks the connection between the seized channel and the channel indicated by the DTMF tones in step 122, the method proceeds to step 134, FIG. 6B, in which the PCM path temporary delay is inserted for a predetermined interval on the identified channel at the E1 interface circuit card 26, FIG. 1. The temporary delay for the sending of data to the peripheral circuits of the receiving switch remains intact on the designated channel. In this alternative method, the delay is removed only upon the connection of a call between the sending switch 30, FIG. 1, and the receiving switch 12 as discussed with respect to step 114, FIG. 6A. The temporary delay is re-established in step 134, FIG. 6B, in response to the termination of the call.

While a detailed description of the preferred embodiment of the invention has been given, it should be appreciated that many variations can be made thereto without departing from the scope of the invention as set forth in the appended claims.

We claim:

1. In a telecommunication system having a multiport receiving switch with a central control circuit for distributing information received over a multichannel link from a multiport sending switch to at least one of a plurality of peripheral circuits which perform a plurality of various applications in the telecommunications system, the improvement being a data delay buffer, comprising:

means responsive to receipt of certain signalling information at the receiving switch to seize a channel at the receiving switch for receipt of data transmitted from the sending switch to at least one of the peripheral circuits of the receiving switch; and means responsive to the seizing of the channel at the receiving switch for temporarily delaying the sending of the data to at least one of the peripheral circuits for a predetermined interval.

2. The telecommunication system of claim 1 including means for selectively changing the predetermined interval of the temporarily delaying means.

3. The telecommunication system of claim 1 including means for terminating the temporarily delaying means in response to connection of a call from the sending switch to the receiving switch.

4. The telecommunication system of claim 1 in which the temporarily delaying means includes means for establishing different delay intervals for the sending of the data to at least one of the peripheral circuits for different channels on the multichannel link.

5. The telecommunication system of claim 1 in which the temporarily delaying means includes means for temporarily storing the data in a memory prior to sending the data to at least one of the peripheral circuits.

6. The telecommunication system of claim 5 in which the temporarily storing means includes means for writing the data into the memory, and means for reading the data from the memory at a time equal to the amount of the predetermined interval after the data has been written into the memory.

7. The telecommunication system of claim 1 in which the data transmitted from the sending switch is in the form of tones.

8. The telecommunication system of claim 7 in which the tones are DTMF tones.

9. The telecommunication system of claim 8 in which the temporarily delaying means includes means for establishing different delay intervals for the sending of DTMF tones to the peripheral circuits for different channels on the multichannel link.

10. The telecommunication system of claim 9 in which the temporarily delaying means includes means for temporarily storing the DTMF tones in a memory prior to sending the tones to at least one of the peripheral circuits.

11. The telecommunication system of claim 10 in which the temporarily storing means includes means for writing the DTMF tones into the memory, and means for reading the DTMF tones from the memory at a time equal to the amount of the predetermined interval after the tones have been written on the memory.

12. The telecommunication system of claim 1 including means for establishing different predetermined delay intervals for the sending of data to at least one of the peripheral circuits for different channels of the receiving switch.

13. The telecommunication system of claim 12 in which the establishing means includes means for selectively changing the different predetermined delay intervals for the different channels of the receiving switch.

14. In a telecommunication system having a multiport receiving switch with a central control circuit for distributing information received over a multichannel link from a multiport sending switch to at least one of a plurality of peripheral circuits which perform a plurality of various applications in the telecommunication system, the improvement being a delay data buffer, comprising:

means for maintaining a temporary delay for the sending of data transmitted from the multiport sending switch to one of the plurality of peripheral circuits at the multiport receiving switch; and means for removing the temporary delay maintaining means in response to the connection of a call between the multiport sending switch and the multiport receiving switch.

15. The telecommunication system of claim 14 in which the data is in the form of DTMF tones.

16. The telecommunication system of claim 15 in which the temporary delay maintaining means includes means for establishing a temporary delay at various predetermined intervals on a plurality of channels at the multiport receiving switch.

17. The telecommunication system of claim 16 including means for selectively changing the various predetermined intervals for the temporary delay of sending data to one of the peripheral circuits on the plurality of channels at the multiport receiving switch.

18. The telecommunication system of claim 15 in which the temporary delay maintaining means includes means for establishing different delay intervals for the sending of the DTMF tones to one of the peripheral circuits on different channels at the multiport receiving switch.

19. The telecommunication system of claim 15 in which the temporary delay maintaining means includes means for temporarily storing the DTMF tones in a memory prior to sending the tones to one of the plurality of peripheral circuits.

20. The telecommunication system of claim 19 in which the temporarily storing means includes means for writing the DTMF tones into the memory, and means for reading the DTMF tones from the memory at a time equal to the amount of a predetermined interval after the tones have been written into memory.

21. The telecommunication system of claim 14 including means for re-establishing the temporary delay in response to a termination of the call connected between the multiport receiving switch and the multiport sending switch.

22. In a telecommunication system having a multiport receiving switch with a central control circuit for distributing information received over a multichannel link from a multiport sending switch to at least one of a plurality of peripheral circuits which perform a plurality of various applications in the telecommunication system, the improvement being a method for delaying sending of data to a peripheral circuit, comprising the steps of:

seizing a channel at the receiving switch for receipt of data transmitted from the sending switch to at least one of the peripheral circuits of the receiving switch in response to receipt of certain signaling information at the receiving switch; and temporarily delaying the sending of the data to the at least one of the peripheral circuits for a predetermined interval in response to the seizing of the channel at the receiving switch.

23. The method of claim 22 including the step of selectively changing the predetermined interval of the temporarily delaying means.

24. The method of claim 22 including the step of terminating the temporarily delaying means in response to connection of a call from the sending switch to the receiving switch.

25. The method of claim 22 in which the step of temporarily delaying includes the step of establishing different delay intervals for the sending of the data to at least one of the peripheral circuits for different channels on the multichannel link.

26. The method of claim 22 in which the step of temporarily delaying includes the step of temporarily storing the data in a memory prior to sending the data to at least one of the peripheral circuits.

27. The method of claim 26 in which the step of temporarily storing includes the steps of writing the data into the memory, and reading the data from the memory at a time equal to the amount of the predetermined interval after the data has been written into the memory.

28. The method of claim 22 in which the data transmitted from the sending switch is in the form of tones.

29. The method of claim 28 in which the tones are DTMF tones.

30. The method of claim 29 in which the step of temporarily delaying includes the step of establishing different delay intervals for the sending of DTMF tones to the peripheral circuits for different channels on the multichannel link.

31. The method of claim 30 in which the step of temporarily delaying includes the step of temporarily storing the DTMF tones in a memory prior to sending the tones to at least one of the peripheral circuits.

32. The method of claim 31 in which the step of temporarily storing includes the steps of writing the DTMF tones into the memory, and reading the DTMF tones from the memory at a time equal to the amount of the predetermined interval after the tones have been written on the memory.

33. The method of claim 22 including the step of establishing different predetermined delay intervals for the sending of data to at least one of the peripheral circuits for different channels of the receiving switch.

34. The method of claim 33 in which the step of establishing predetermined delay intervals includes the step of selectively changing the different predetermined delay intervals for the different channels of the receiving switch.

35. In a telecommunication system having a multiport receiving switch with a central control circuit for distributing information received over a multichannel link from a multiport sending switch to at least one of a plurality of peripheral circuits which perform a plurality of various applications in the telecommunication system, the improvement being a method for delaying the sending of data to a peripheral circuit, comprising the steps of:

maintaining a temporary delay for the sending of data transmitted from the multiport sending switch to one of the plurality of peripheral circuits at the multiport receiving switch; and removing the temporary delay in response to the connection of a call between the multiport sending switch and the multiport receiving switch.

36. The method of claim 35 in which the data is in the form of DTMF tones.

37. The method of claim 36 in which the step of maintaining the temporary delay includes the step of establishing the temporary delay of various predetermined intervals on a plurality of channels at the multiport receiving switch.

38. The method of claim 37 including the step of selectively changing the various predetermined intervals for the temporary delay of sending data to one of the peripheral circuits on the plurality of channels at the multiport receiving switch.

39. The method of claim 36 in which the step of maintaining a temporary delay includes the step of establishing different delay intervals for the sending of the DTMF tones to one of the peripheral circuits on different channels at the multiport receiving switch.

40. The method of claim 36 in which the step of maintaining a temporary delay includes the step of temporarily storing the DTMF tones in a memory prior to sending the tones to one of the plurality of peripheral circuits.

41. The method of claim 40 in which the step of temporarily storing includes the steps of writing the DTMF tones into the memory, and reading the DTMF tones from the memory at a time equal to the amount of a predetermined interval after the tones have been written into memory.

42. The method of claim 35 including the step of re-establishing the temporary delay in response to a termination of the call connected between the multiport receiving switch and the multiport sending switch.

* * * * *